J. K. CULLEN AND W. T. SEARS.
AXLE MILLING MACHINE.
APPLICATION FILED FEB. 2, 1921.
1,424,755.
Patented Aug. 8, 1922.
2 SHEETS—SHEET 1.
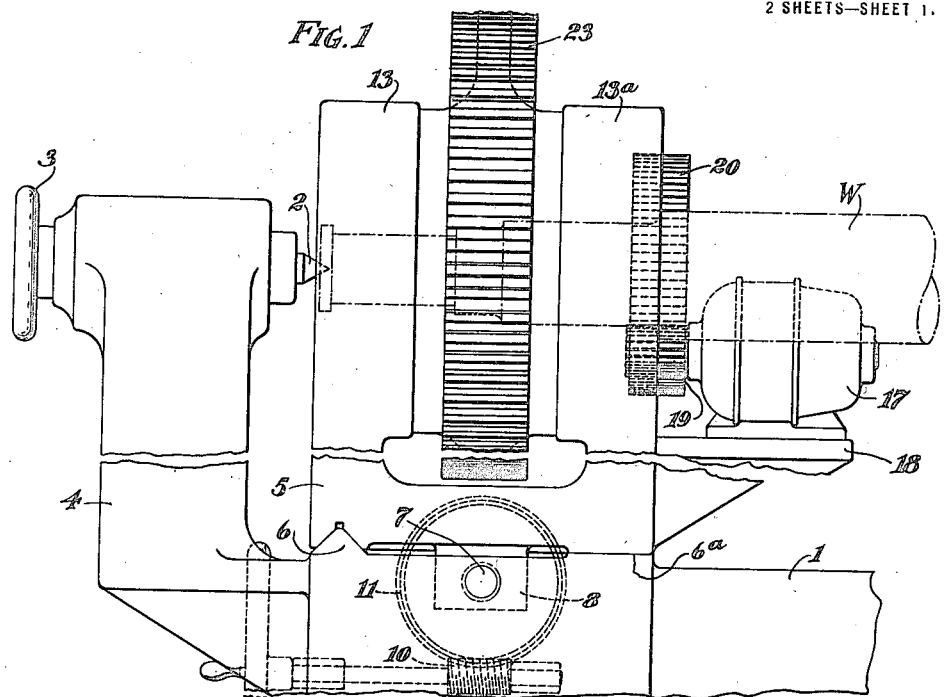
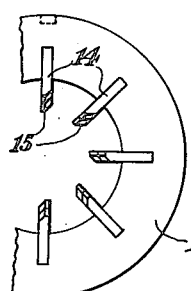
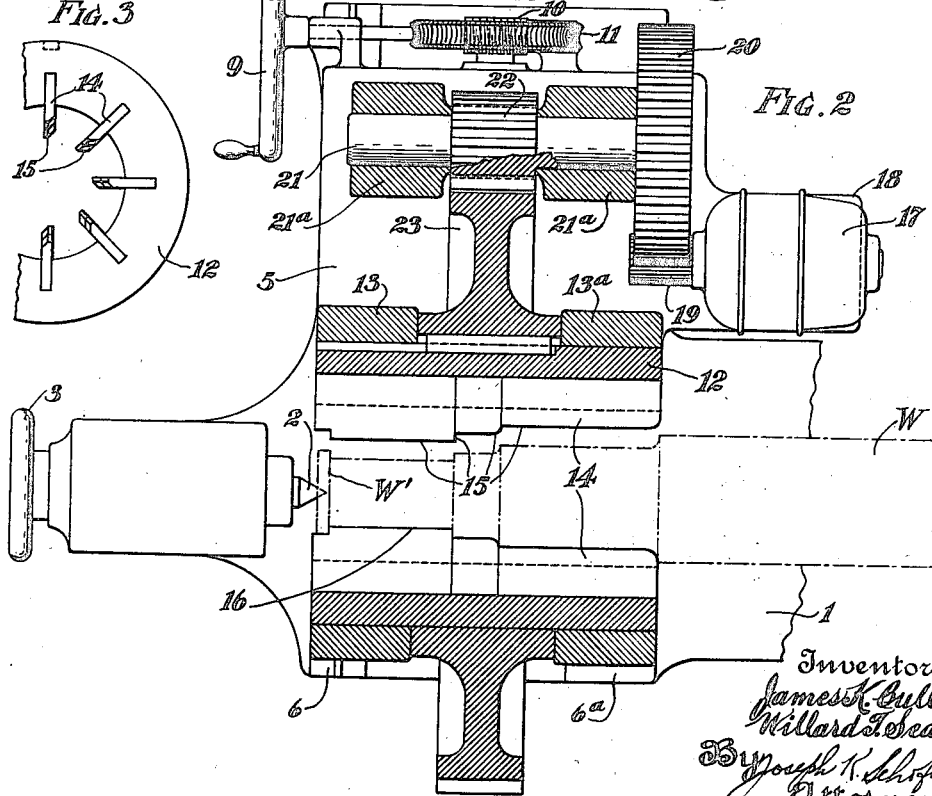

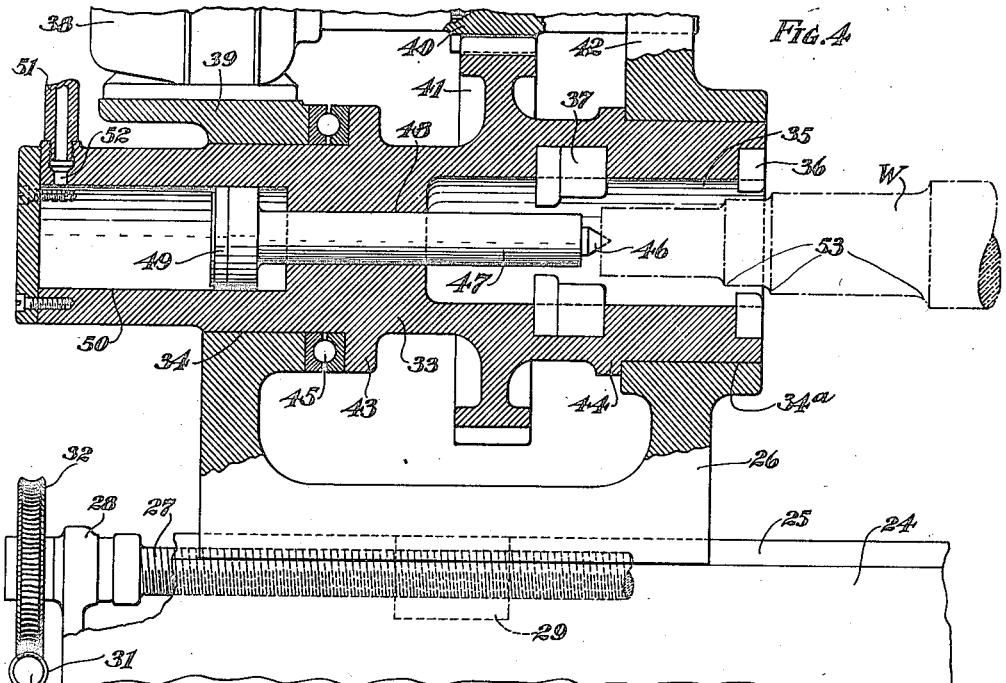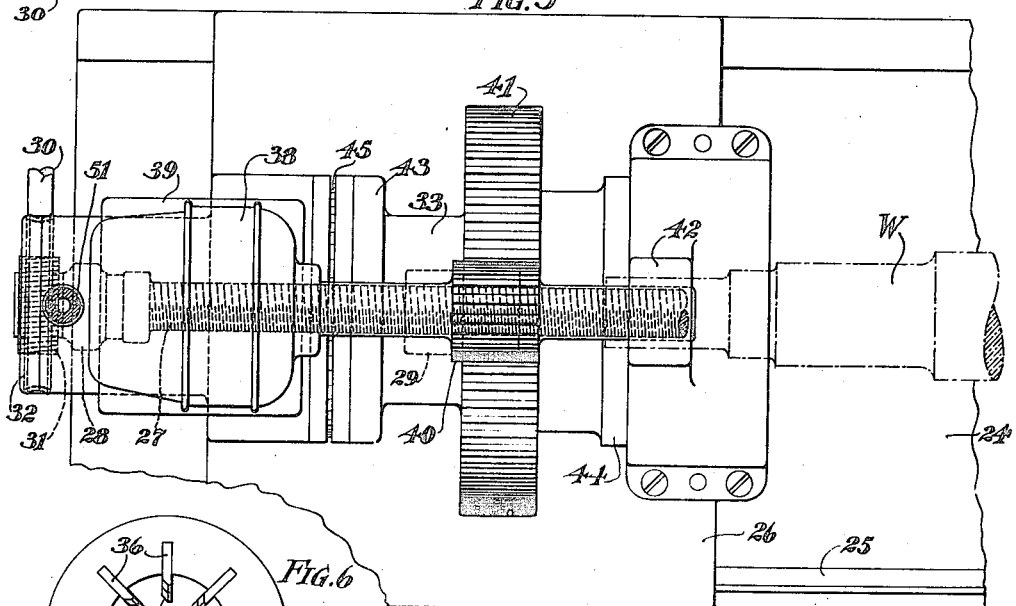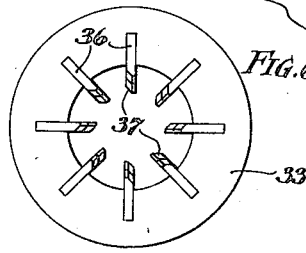

UNITED STATES PATENT OFFICE.

JAMES K. CULLEN, OF NEW YORK, N. Y., AND WILLARD T. SEARS, OF MONTCLAIR, NEW JERSEY, ASSIGNORS TO NILES-BEMENT-POND COMPANY, OF NEW YORK, N. Y., A CORPORATION OF NEW JERSEY.

AXLE-MILLING MACHINE.

1,424,755.   Specification of Letters Patent.   Patented Aug. 8, 1922.

Application filed February 2, 1921. Serial No. 441,847.

*To all whom it may concern:*

Be it known that we, JAMES K. CULLEN and WILLARD T. SEARS, citizens of the United States, residing, respectively, at New York, in the county of New York, in the State of New York, and Montclair, in the county of Essex, in the State of New Jersey, have invented new and useful Improvements in Axle-Milling Machines, of which the following is a specification.

This invention relates to milling machines and particularly to machines for milling cylindrical work such as shafts, axles and the like. Operations of this type are quite commonly performed by turning. However, under certain conditions and with certain classes of work, such operations may be more conveniently and accurately performed by milling. The invention herein has for its primary object the provision of improved mechanism particularly adapted to perform milling operations of the type stated.

It is an object of the invention to provide, in combination with means for rotatably supporting a piece of work, improved means for rotatably mounting a formed internal milling cutter in a position adapted to surround the work, means for moving the cutter toward and from the work and into cutting engagement therewith, and means for rotating the cutter in all its positions of movement.

It is an object of the invention to provide a milling machine comprising improved means for rotatably supporting one end of a piece of work, means for rotatably mounting an internal milling cutter in a position adapted to surround the work, means for moving the cutter longitudinally of the work in the cutter feeding operation thereof and a motor for driving the cutter.

Other and more specific objects of the invention will appear as the description thereof proceeds.

Referring to the figures of the drawings:

Figure 1 is a partial side elevation of a machine embodying the present invention.

Fig. 2 is a horizontal plan sectional view thereof.

Fig. 3 is a fragmentary end view of the milling cutter illustrated in Figs. 1 and 2.

Fig. 4 is a side elevation partly in section showing a modified form of the invention.

Fig. 5 is a plan view thereof.

Fig. 6 is a fragmentary end view of the cutter illustrated in Figs. 4 and 5.

In accordance with the objects of our invention as heretofore previously stated, we provide means, such as a center, for rotatably supporting one end of an axle or other like piece to be milled. Adjacent and coaxial with the center we provide a milling cutter of the internal type, the teeth thereof extending radially inward and being adapted to surround the work. Means is provided for moving the cutter into cutting engagement with the work either radially of the work or longitudinally thereof and such movement of the cutter may comprise the movement of the support on which the cutter is mounted, as shown in the drawings, if desired. The cutter may be rotated by any desired means, as the driving motor illustrated as mounted directly on the cutter support, the motor thereby partaking of all the bodily movements of the cutter.

Referring more specifically to the drawings and particularly to Figs. 1, 2 and 3 thereof, 1 indicates the base of a milling machine. A work supporting center 2 adapted to be operated by a hand wheel 3 is mounted on a bracket 4 on the base, the center being adapted to rotatably support one end of a piece of work W. A cutter support or carriage 5 is mounted to slide transversely of the machine on ways 6 and 6ª, and is adjustable thereon by means of a screw 7 journaled in the base end engaging a nut 8 on the support. A hand wheel 9, worm 10 and worm wheel 11 serve to operate the screw to move the carriage toward and from the work. The work W is illustrated as being an axle, the end of which is to be milled as illustrated.

The milling cutter 12 is of the internal type and is rotatably mounted in bearings 13 and 13ª in the cutter support. The teeth 14 of the cutter extend radially inward and each is provided with a formed cutting edge 15 according to the shape it is desired to cut in the work piece as illustrated at 16. The cutter is preferably rotated from a motor 17 mounted on a bracket 18 on the support 5 and is operatively connected to the cutter through gears 19 and 20, shaft 21 and gears 22 and 23. The shaft 21 is supported in bearings 21ª on the support 5 and the gear 23 is keyed to the cutter intermediate the bearings 13 and 13ª as illustrated.

In operation, the center 2 is adapted to rotatably support one end of the work as illustrated, any suitable means being provided to rotate the work. While the work is rotated, the cutter may be moved into engagement with the work by rotating the hand wheel 9. The driving connection between the motor and cutter is maintained in all positions of the cutter since all such parts are mounted on the cutter support.

The construction shown in Figs. 4, 5 and 6 of the drawing is similar to that illustrated in Figs. 1, 2 and 3, the principal difference being that the cutter is fed longitudinally of the work instead of radially thereof. In this form of the invention 24 illustrates the base of the machine on ways 25 of which is longitudinally slidably mounted a cutter support or carriage 26. A screw 27 journaled in the bracket 28 on the base engages a nut 29 extending from the carriage whereby the carriage is moved on its ways. A shaft 30 driven from any suitable source of power is provided with a worm 31 thereon engaging a worm wheel 32 on the screw whereby the screw is rotated to feed the carriage.

The cutter broadly comprises a member 33 rotatably mounted in bearings 34 and 34ª on the support 26. A bore 35 is formed in the forward end of this member and the milling cutter proper comprises a plurality of cutting teeth 36 and 37 inserted radially therein. These teeth as illustrated have their cutting edges formed to the shape it is desired to mill on the work piece and the cutter 36 is spaced longitudinally from the cutter 37 in accordance with the work to be operated upon. The cutter is rotated from a motor 38 mounted on a bracket 39 on the support and operatively connected to the cutter through a pair of gears 40 and 41 on the motor shaft and cutter respectively. The free end of the motor shaft is preferably supported in a bearing 42 whereby the gear 40 is securely held in its driving position. The member 33 is prevented from endwise movement by means of annular shoulders 43 and 44 adapted to bear against the bearings 34 and 34ª respectively. A ball thrust bearing 45 is provided between the annular shoulder 43 and bearing 34 whereby to receive the thrust of the tool during the milling operation.

In combination with the rotary cutter mechanism shown in Figs. 4, 5 and 6, we provide a novel work supporting means illustrated as a center 46. This center is mounted on a plunger 47 slidable in a bore 48 in the cutter member 33 and provided at its rear end with a piston 49 movable in a cylinder 50 in the member 33. Fluid pressure from any convenient source of supply 51 is adapted to enter the cylinder at 52.

In operation, the work is first positioned as shown in Fig. 4 and fluid pressure is admitted to the cylinder at 52 to engage the center with the work. The feed screw 27 is then rotated to bring the cutter longitudinally into engagement with the work. It will be seen that the center, being yieldingly mounted will yield relative to the cutter and thereby support the work as the cutter moves over the same. The work as finished by the longitudinally movable cutter is necessarily of a diminishing diameter from the inner portion to the end thereof as seen at 53. For milling work pieces having inwardly facing shoulders therein as the shoulder W' on the work piece shown in Fig. 2, the feed of the cutter must necessarily be radial as illustrated in Figs. 1 and 2.

What we claim is:

1. In a milling machine, the combination of a base, means thereon for rotatably supporting one end of a piece of work, a cutter support, an internal milling cutter rotatably mounted on the support and having internal cutting teeth longitudinally therealong, the said teeth extending radially inward to different distances along the cutter and being adapted to surround the work, means for moving the cutter toward and from the work, and means for rotating the cutter whereby to mill stepped cylindrical portions of different diameters on the work piece.

2. In a milling machine, the combination of a base, means thereon for rotatably supporting one end of a piece of work, a cutter support, an internal milling cutter rotatably mounted on the support and having internal cutting teeth longitudinally therealong, the said teeth extending radially inward to different distances along the cutter and being adapted to surround the work, means for moving the cutter toward and from the work, a gear mounted concentrically of the cutter, and a second gear meshing therewith for rotating the cutter in all its positions of movement relative to the work.

3. In a milling machine, the combination of a base, means thereon for rotatably supporting one end of a piece of work, a cutter support, an internal milling cutter rotatably mounted on the support, the teeth of the cutter extending radially inward and being adapted to surround the work, means for moving the cutter toward and from the work, and a motor mounted on the support and operatively connected to the cutter to rotate the same.

4. In a milling machine, the combination of a base, means thereon for rotatably supporting one end of a piece of work, a cutter support, a formed internal milling cutter rotatably mounted on the support, the teeth of the cutter extending radially inward to different distances along the cutter and being adapted to surround the work, a screw for moving the cutter toward and from the work, and means for rotating the cutter in all its positions whereby to mill a formed portion on the work piece corresponding to the contour of the cutter.

5. In a milling machine, the combination of a base, means thereon for rotatably supporting one end of a piece of work, a cutter support, an internal milling cutter rotatably mounted on the support and having internal cutting teeth longitudinally therealong, the said teeth extending radially inward to different distances along the cutter and being adapted to surround the work, means for rotating the cutter, and means for moving the cutter into engagement with the work in a manner to mill a portion of the length thereof into a circular contour corresponding to the contour of the milling cutter teeth.

6. In a milling machine, the combination of a base, means thereon for rotatably supporting one end of a piece of work, a cutter support, an internal milling cutter rotatably mounted on the support, the teeth of the cutter extending radially inward and being adapted to surround the work, means for moving the support to engage the cutter with the work, and a motor mounted on the support and operatively connected to the cutter to rotate the same.

7. In a milling machine, the combination of a base, means thereon for rotatably supporting one end of a piece of work, a cutter support, an internal milling cutter rotatably mounted on the support and having internal cutting teeth longitudinally therealong, the said teeth extending radially inward to different distances along the cutter and being adapted to surround the work, means for feeding the cutter longitudinally of the work, and means for rotating the cutter whereby to mill stepped cylindrical portions of different diameters on one end of the work piece.

8. In a milling machine, the combination of a base, means thereon for rotatably supporting one end of a piece of work, a cutter support, an internal milling cutter rotatably mounted on the support, the teeth of the cutter extending radially inward and being adapted to surround the work, means for feeding the cutter longitudinally of the work, and a motor mounted on the support and operatively connected to the cutter to rotate the same.

9. In a milling machine, the combination of a base, means thereon for rotatably supporting one end of a piece of work, a cutter carriage, an internal milling cutter rotatably mounted on the carriage and adapted to surround the work, the teeth of the cutter extending radially inward to different distances along the cutter and having peripheral and front cutting edges thereon, means for feeding the carriage longitudinally of the work to move the cutter over the work, and means for rotating the cutter in all its positions whereby to mill a formed portion on the work piece corresponding to the contour of the cutter.

10. In a milling machine, the combination of a base, means thereon for rotatably supporting one end of a piece of work, a cutter carriage, an internal milling cutter rotatably mounted on the carriage and adapted to surround the work, the teeth of the cutter extending radially inward and having peripheral and front cutting edges thereon, means for feeding the carriage longitudinally of the work to move the cutter over the work, and a motor mounted on the carriage and operatively connected to the cutter to rotate the same.

11. In a milling machine, the combination of a base, a cutter support mounted thereon, means on the support for supporting one end of a piece of work, an internal milling cutter rotatably mounted on the support, the teeth of the cutter extending radially inward and being adapted to surround the work, means for moving the cutter toward and from the work, and means for rotating the cutter.

12. In a milling machine, the combination of a base, a cutter support mounted thereon, a center on the support for rotatably supporting one end of a piece of work, an internal milling cutter rotatably mounted on the support, the teeth of the cutter extending radially inward and being adapted to surround the work, means for moving the cutter toward and from the work, and means for rotating the cutter.

13. In a milling machine, the combination of a base, a cutter support mounted thereon, means on the support for supporting one end of a piece of work, an internal milling cutter rotatably mounted on the support, the teeth of the cutter extending radially inward and being adapted to surround the work, means for feeding the cutter longitudinally of the work, and means for rotating the cutter.

14. In a milling machine, the combination of a base, a cutter carriage mounted thereon, a yieldable center on the carriage for rotatably supporting one end of a piece of work, an internal milling cutter rotatably mounted on the carriage, the teeth of the cutter extending radially inward and being adapted to surround the work, means for feeding the carriage longitudinally of the work, and means for rotating the cutter.

15. In a milling machine, the combination of a base, a cutter carriage mounted thereon, an internal milling cutter rotatably mounted on the carriage, the teeth of the cutter extending radially inward and being adapted to surround the work, a longitudinally movable center mounted in the carriage coaxially of the cutter, mechanism for operating the center by fluid pressure to rotatably support one end of a piece of work, means for feeding the carriage longitudinally of the work, and means for rotating the cutter.

In testimony whereof, we hereto affix our signatures.

JAS. K. CULLEN.
WILLARD T. SEARS.